United States Patent
Birk et al.

(10) Patent No.: US 7,487,361 B2
(45) Date of Patent: Feb. 3, 2009

(54) DYNAMIC CACHE LOOKUP BASED ON DYNAMIC DATA

(75) Inventors: Peter Daniel Birk, Austin, TX (US); Ching-Yun Chao, Austin, TX (US); Hyen Vui Chung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 10/881,962

(22) Filed: Jun. 30, 2004

(65) Prior Publication Data

US 2006/0020813 A1    Jan. 26, 2006

(51) Int. Cl.
*H04L 9/00* (2006.01)
*H04L 9/32* (2006.01)

(52) U.S. Cl. .......................... 713/185; 726/2
(58) Field of Classification Search ................. 713/185; 726/2
See application file for complete search history.

(56) References Cited

U.S. PATENT DOCUMENTS

| | | | | |
|---|---|---|---|---|
| 6,035,404 | A * | 3/2000 | Zhao ............................. | 726/6 |
| 6,052,785 | A * | 4/2000 | Lin et al. ....................... | 726/5 |
| 6,236,909 | B1 * | 5/2001 | Colson et al. .................. | 701/1 |
| 6,314,425 | B1 * | 11/2001 | Serbinis et al. ................ | 707/10 |
| 6,438,219 | B1 * | 8/2002 | Karau et al. ........... | 379/112.01 |
| 6,463,474 | B1 * | 10/2002 | Fuh et al. ..................... | 709/225 |
| 6,965,939 | B2 * | 11/2005 | Cuomo et al. ................ | 709/229 |
| 6,993,596 | B2 * | 1/2006 | Hinton et al. ............... | 709/250 |
| 7,017,051 | B2 * | 3/2006 | Patrick ......................... | 726/12 |
| 7,216,236 | B2 * | 5/2007 | Kou et al. .................... | 713/183 |
| 7,260,724 | B1 * | 8/2007 | Dickinson et al. ........... | 713/182 |
| 2003/0163707 | A1 * | 8/2003 | Shigeeda ..................... | 713/182 |

OTHER PUBLICATIONS

Heilbronner et al., "Managing PC Networks," Oct. 1997, IEEE Communications Magazine, pp. 112-117.*
Zhibin et al., "Dynamic Authentication Protocol for Personal Communication System (PCS)", International Conference on Communication Technology Oct. 1998, pp. 1-5.*
Lewis et al., Hashing for Dynamic and Static Internal Tables, Oct. 1988, IEEE Computer, pp. 45-56.*

* cited by examiner

*Primary Examiner*—Kambiz Zand
*Assistant Examiner*—William S Powers
(74) *Attorney, Agent, or Firm*—Duke W. Yee; Matthew Talpis; Gerald H. Glanzman

(57) ABSTRACT

A system and method for tracking user security credentials in a distributed computing environment. The security credentials of an authenticated user includes not just his unique user identifier, but also a set of security attributes such as the time of authentication, the location where the user is authenticated (i.e., intranet user v. internet user), the authentication strength, and so on. The security attributes are used in access control decisions. The same user can be given different authorization if he has a different security attribute value. Security credentials may be generated either by WebSphere security code or by third party security provider code. This invention stores the user credentials in a distributed cache and provides a system and method to compute the unique key based on the dynamic security credentials for cache lookup

3 Claims, 3 Drawing Sheets

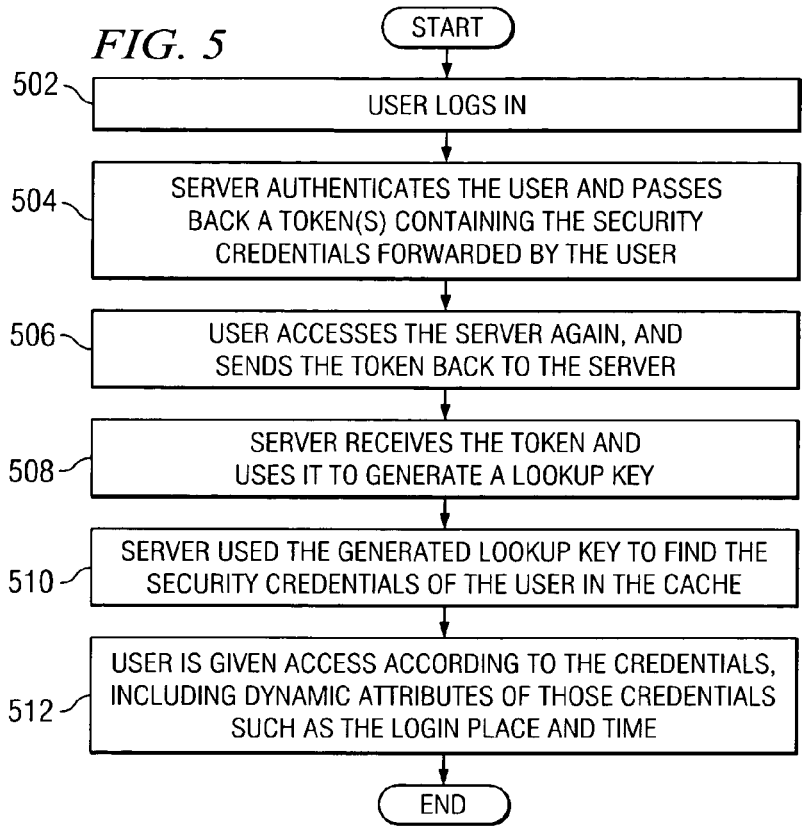
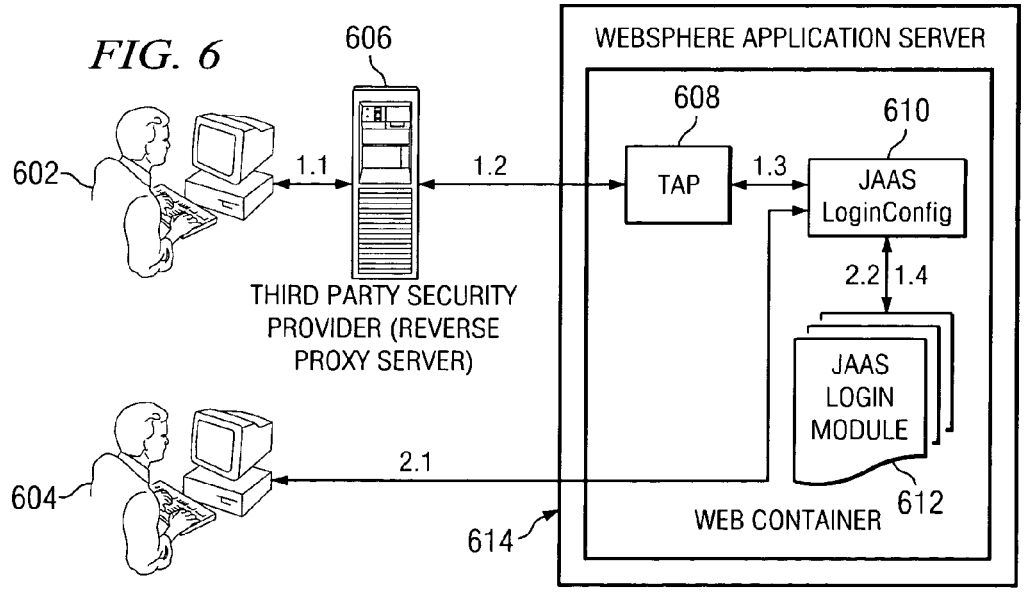

US 7,487,361 B2

DYNAMIC CACHE LOOKUP BASED ON DYNAMIC DATA

BACKGROUND OF THE INVENTION

1. Technical Field

The present invention relates generally to caching of security attributes, and particularly to dynamic cache lookup based on dynamic data.

2. Description of Related Art

Caching is an important technique that improves the efficiency of many tasks performed in a computer system. Among other areas, caching has been applied to security, particularly authentication. In a distributed security system, it is sometimes expensive to create or collect the authentication data. Collection of such data can require remote network calls to a user registry or security services to request the necessary data. This is improved by caching the authentication data for a user so that the authentication data need not be recreated or collected for the "same login," aka a login with the same authentication data.

WebSphere™ application server provides caching for authentication data with lookup based on static authentication information, such as the hash (username, password) or accessID (constant unique identifier for a given user). In this case, from a security perspective, the uniqueness of a "login user" of a session is not only based on the static data, but rather it is based on some security attributes that depend on the authentication process.

This way of authentication associates uniqueness of a logon user with security attributes, particularly with static security data. Hence, if two sessions are logged in with the same accessID, the same security attributes will have to apply to both. It would therefore be beneficial to provide a way for the same accessID to be logged into the system multiple simultaneous times, but allowing different security attributes.

SUMMARY OF THE INVENTION

In a preferred embodiment, the present invention provides security cache based on dynamic security attributes. By providing cache lookup based on dynamic security attributes, a user with the same acccessID can log into the system simultaneously with different security attributes. In one example embodiment, the present invention includes authenticating a logon user, storing tokens associated with security credentials for the logon user, and computing a unique cache lookup key from the tokens, wherein the security credentials include dynamic security credentials. Other implementations and embodiments are described more fully in the detailed description that follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein;

FIG. 5 shows a process flow for steps implementing a preferred embodiment of the present invention.

FIG. 6 shows an example implementation of authentication according to a preferred embodiment of the present invention.

DETAILED DESCRIPTION OF THE PREFERRED EMBODIMENT

Figure 1:
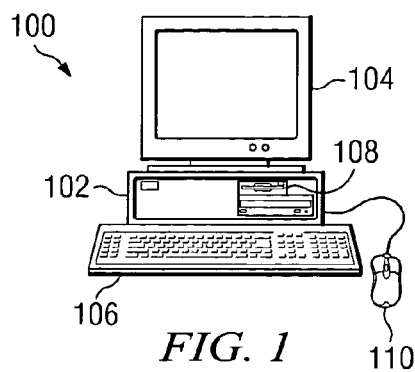
FIG. 1 shows a computer system consistent with implementing a preferred embodiment of the present invention.

The present invention is implemented within the context of a computer system, preferably a networked computer system such as that shown in the following examples. With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
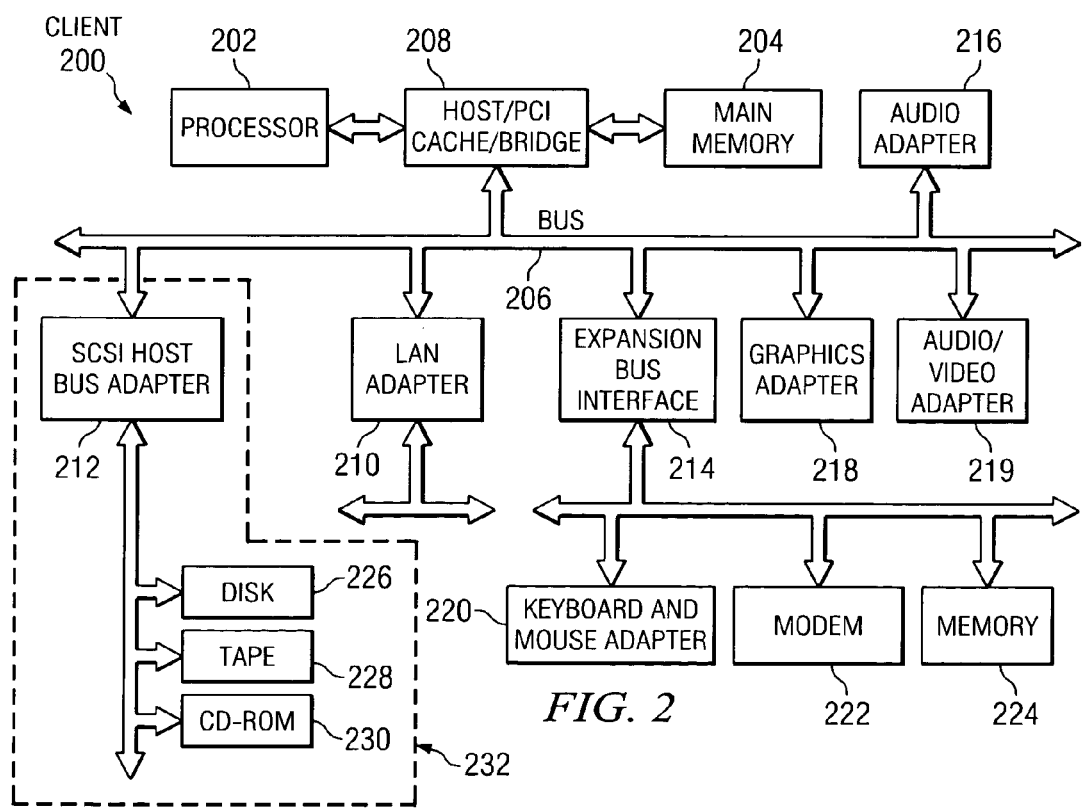
FIG. 2 shows a diagram of elements of a computer system, consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
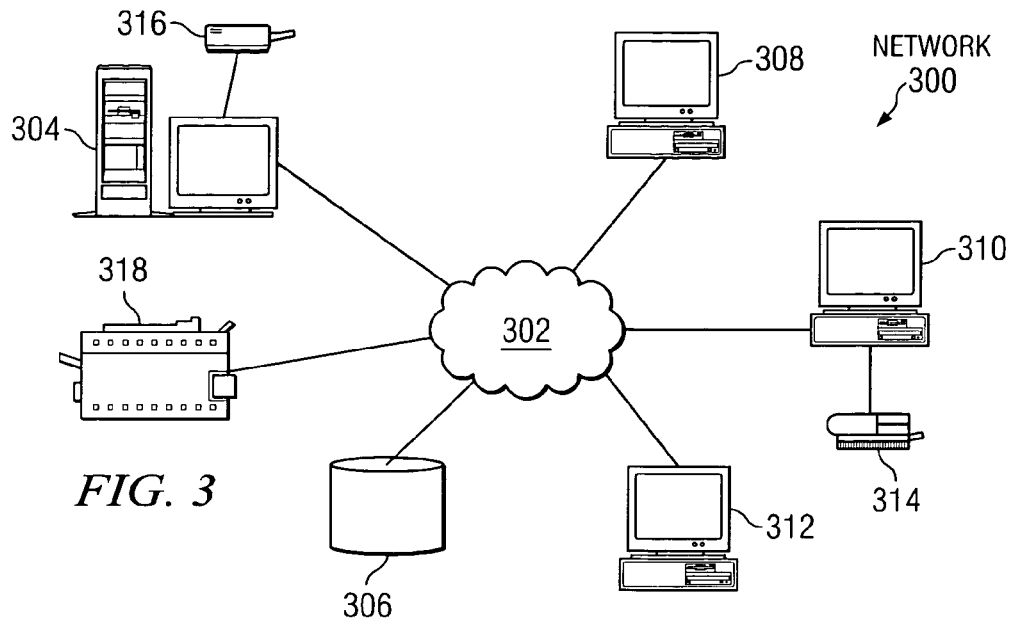
FIG. 3 shows a computer network consistent with implementing a preferred embodiment of the present invention.

With reference now to the figures, FIG. 3 depicts a pictorial representation of a network of data processing systems in which the present invention may be implemented. Network data processing system 300 is a network of computers in which the present invention may be implemented. Network data processing system 300 contains a network 302, which is the medium used to provide communications links between various devices and computers connected together within network data processing system 300. Network 302 may include connections, such as wire, wireless communication links, or fiber optic cables.

In the depicted example, a server 304 is connected to network 302 along with storage unit 306. In addition, clients 308, 310, and 312 also are connected to network 302. These clients 308, 310, and 312 may be, for example, personal computers or network computers. In the depicted example, server 304 provides data, such as boot files, operating system images, and applications to clients 308-312. Clients 308, 310, and 312 are clients to server 304. Network data processing system 300 includes printers 314, 316, and 318, and may also include additional servers, clients, and other devices not shown.

In the depicted example, network data processing system 300 is the Internet with network 302 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 3 is intended as an example, and not as an architectural limitation for the present invention.

The present invention is now described with reference to a preferred application server, namely WebSphere Application Server 5.1.1, which has included therein security attributes propagation support. It is noted that this is only one example environment in which the innovations herein described may be implemented, and the invention is not limited to this environment.

The present invention teaches how to base security cache on dynamic security attributes. Prior art security caching for authentication works by caching static information related to a user, reducing the cost of retrieving that information later. However, this does not work when the uniqueness of a logon user is not based on static data, but is based instead on dynamic security attributes.

Figure 4:
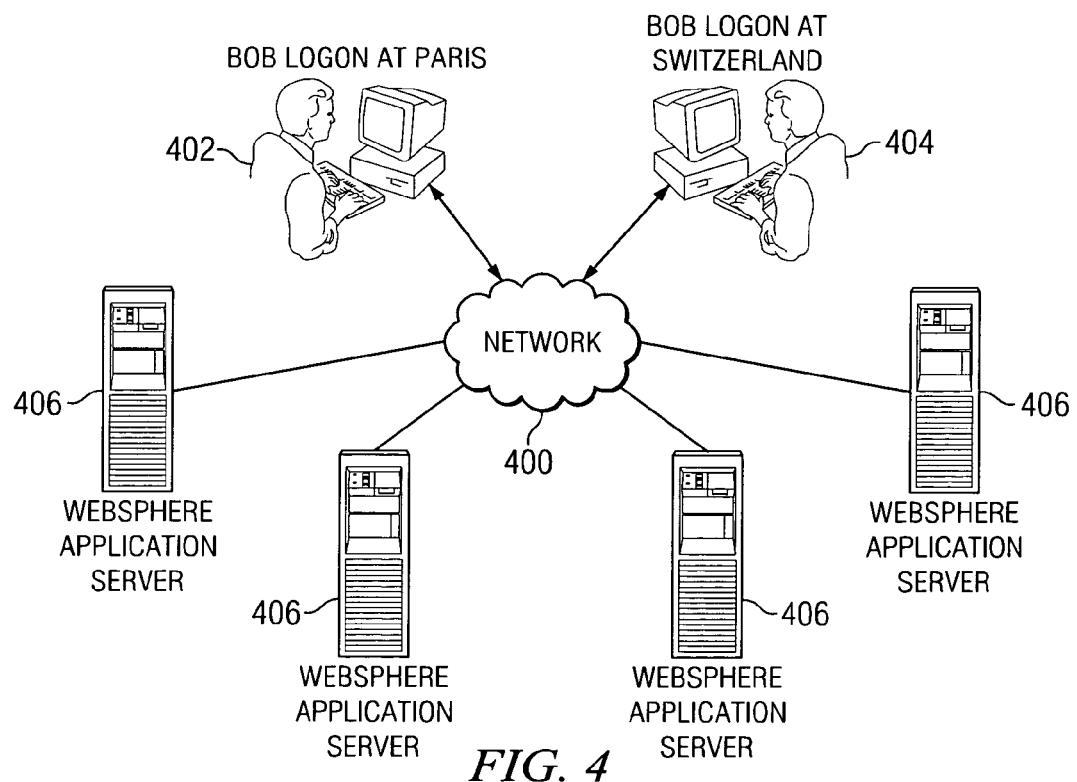
FIG. 4 shows a computer network where two computers serve as access points to the network, consistent with implementing a preferred embodiment of the present invention.

FIG. 4 shows an example of two network 400 access points where the same accessID is logged into both workstations 402, 404. In this example, workstation 402 is in Paris, and workstation 404 is in Switzerland. They communicate with WebSphere Application Servers on the network, for example, server 406. In prior art systems, a hash of username and password along with an accessID are used to determine uniqueness of logon users for workstations 402, 404. However, "Bob" accessID at workstation 402 that was logged in at 4:50 pm is not necessarily the same as "Bob" accessID at workstation 404 with a logon time of 5 pm, because of the innovative dynamic attributes. In this case, there is a dynamic attribute that distinguishes the two logon users, namely the time the session was initiated. The present invention takes advantage of dynamic attributes to produce a security cache based on these dynamic security attributes. By providing cache lookup based on dynamic security attributes, it is possible to allow users with the same accessID to log into the system simultaneously with different security attributes, and the uniqueness is based on the static data (accessID in this example)+dynamic security attributes (such as location, time, or other variables). However, each session is unique, even with the same usernames, because their security attributes are different. Thus their access rights can be different, even if the accessID is the same.

In a preferred embodiment, the present invention is implemented in an environment that supports security attributes propagation, such as the WebSphere Application Server 5.1.1. The present invention takes advantage of the ability of third party security providers to add custom security attributes to the WebSphere authenticated JAAS (Java Authentication and Authorization Service) subject. The subject is the container for security credentials for a user. There are multiple ways for third party security to populate security attributes in WebSphere authenticated JAAS subject, some preferred embodiments of which will be described below.

This allows modification of the type of data collected for security credentials. This added information, in turn, can be used to create a lookup key that will permit caching of those credentials, for example, in a cache or in a distributed cache. In the present invention, the JAAS subject preferably includes dynamic security attributes. Including dynamic security attributes as taught herein allows caching of those attributes, which in turn allows authentication of a single accessID multiple times with different security attributes and hence different rights. This permits, for example, users to logon with their accessID at work and have a first set of access rights, while if they logon at home they can have a different set of rights. Likewise, a user who logs on during work hours can have a first set of rights while logging on after hours may only permit a second set of rights.

In a preferred embodiment, a third party security provider provides custom JAAS LoginModules stacked in the JAAS Login Configuration. These custom JAAS LoginModules are called as part of the WebSphere authentication process. The modification preferably includes the Token.getUniqueID( ) to make it collect the desired information. When this happens, the authentication process will include that information when the token is generated by the server, as described more fully below.

Authentication can be performed by third party trusted security provider. The third party security provider can provide unique identifier based on dynamic data it collects through the TAI (Trust Association Interceptor). The enhanced TAI returns a JAAS subject with login properties with security information to WebSphere. This security information is then added to the WebSphere authentication JAAS subject as security attributes.

In a preferred embodiment, seen from a system perspective, the present invention is described with reference to the process steps of FIG. 5. First the user logs in (step 502) though the web browser. The server authenticates the user and passes back a token(s) as a cookie containing the minimal security credentials of the authenticated user (step 504). In a preferred embodiment the token is an SSO (single-sign on) token. Later the user accesses the server again, and sends the token back to the server (step 506). The server receives the token which contains the lookup key (step 508). The lookup key is preferably a one-way hash of all the unique security attributes, both static and dynamic. The server then uses the generated lookup key to find the security credentials of the user in the cache, such as a distributed cache (step 510). When the credentials are found, the user is given access according to the credentials, including dynamic attributes of those credentials such as the login place and time (step 512). The access granted can differ depending on the credentials, as described above. Hence, a user can now sign on with the same accessID and obtain different credentials depending on, for example, the time the user logs in and the location from where the user logs in.

After the user is successfully authenticated (for example, after step 504 above), a WebSphere authenticated JAAS subject is created. This JAAS subject contains a set of tokens created by WebSphere and tokens that are created by the third party JAAS LoginModule. This information is used by WebSphere to runtime compute the cache lookup key, for example, based on a hash:

unique lookup key=hash[all tokens.getUniqueID( )]

By providing the token.getuniqueID( ) implementation, third parties determine the uniqueness of the security attributes.

After the unique lookup key is created, then the cache is updated with the unique key as the lookup key and the WebSphere authenticated JAAS subject. The content of the cache can be pushed to other front end servers, to take advantage of distributed cache technology. The unique lookup key is also added to the SSO token so that it can be retrieved remotely.

By allowing third party security providers to modify the type of data collected for credentials, the information used to generate the lookup key is also thereby within the control of the third party security provider. The third party modifications can preferably be implemented in combination of TAI and the JAAS LoginModule. As mentioned above, the third party can provide implementation that generates unique identifier based on the custom security attributes through the Token.getUniqueID( ) method. If this is done, the authentication process will include that information when the token is generated by the server (as in step 508, above). Third party modifications are also preferably implemented in the TAI, which is extended to supply a unique ID for the cache lookup based on what the third party wants as security credentials.

FIG. 6 shows the innovative process in the context of a third party security provider or an application server with a JAAS login module. User 602 in this example authenticates with third party security provider 606 at arrow 1.1. The third party security provider collects all the necessary authentication data and security attributes (including time of login, location, etc.) and authenticates the user 602. Then at arrow 1.2, third party security provider 606 implements TAI 608. TAI 608 is used to integrate the third party security provider 606 with WebSphere. In TAI, trust is validated between third party security provider 606 and WebSphere application server 614. TAI 608 returns the identity and security attributes collected in step 1.1 to the application server 614. WebSphere passes the identity and security attributes to JAAS login Configuration 610 at arrow 1.3 to create the JAAS Subject for the authenticated identity obtained from TAI. Authentication is not performed here as it was already performed in step 1.1.

Next, as represented by arrow 1.4, each JAAS Login Module 612 in the JAAS Login Configuration 610 is called. Third party security provider 606 provides an implementation of JAAS Login Module 612 that creates necessary tokens based on the security attributed in step 1.1. Token implementation can be provided to represent the security attributes of the authenticated users. If the uniqueness of a user depends on the security attributes (time of login or location, etc.) Token.getUniqueID( ) can provide a unique identifier. This will be taken into consideration for SSO token and calculating the key for cache lookup.

In the case of user 604, user 604 is authenticated to the WebSphere Application Server 614. This process is essentially the same as occurs in arrow 1.4, but in this case authentication is performed and JAAS Subject is created. However, the custom JAAS Login Module 612 implementation can be provided to create a token for security attributes. If the uniqueness of the user depends on the security attributes, Token.getUniqueID( ) can provide a unique identifier, as described above.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of caching authentication data on a computer network, comprising the steps of:
   receiving, at a server in a computer network, an access request by a login user;
   the server authenticating the login user based on security credentials forwarded by the login user and sending a token back to the login user, wherein the token comprises a single-sign on token and contains the security credentials forwarded by the login user;
   the server receiving a later access request by the login user, the later access request including the token;
   the server generating a unique lookup key using the token, the unique lookup key comprising a one-way hash of unique security attributes, wherein the unique security attributes comprises static security attributes including an access ID, and dynamic security attributes including a login time and a login location, and wherein the dynamic security attributes are selected based on a login module;
   the server using the generated unique lookup key to find security credentials of the login user in a distributed cache; and
   the server granting the later access request by granting access rights to the login user according to the security credentials in the distributed cache, wherein the security credentials in the distributed cache vary according to both the static security attributes and the dynamic security attributes, such that the login user having the same static security attributes is granted different access rights according to differences in the dynamic security attributes.

2. The method of claim 1, further comprising:
   providing the login module with the dynamic security attributes.

3. The method of claim 1, wherein the access ID is simultaneously logged into the network as two different login users based on the dynamic security attributes.

* * * * *